United States Patent
Szabo et al.

(10) Patent No.: US 9,154,424 B1
(45) Date of Patent: Oct. 6, 2015

(54) METHOD AND SYSTEM FOR SCALING NETWORK TRAFFIC MANAGERS USING CONNECTION KEYS

(71) Applicant: F5 NETWORKS, INC., Seattle, WA (US)

(72) Inventors: Paul I. Szabo, Seattle, WA (US); Greg W. Davis, Spokane, WA (US); David D. Schmitt, Seattle, WA (US); Alan B. Mimms, Spokane, WA (US); Richard Roderick Masters, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 14/019,430

(22) Filed: Sep. 5, 2013

Related U.S. Application Data

(60) Continuation of application No. 13/181,418, filed on Jul. 12, 2011, now Pat. No. 8,553,542, which is a division of application No. 10/659,011, filed on Sep. 10, 2003, now Pat. No. 8,004,971, which is a continuation-in-part of application No. 10/119,433, filed on Apr. 9, 2002, now Pat. No. 7,102,996.

(60) Provisional application No. 60/293,466, filed on May 24, 2001.

(51) Int. Cl.
*G01R 31/08* (2006.01)
*H04L 12/803* (2013.01)

(52) U.S. Cl.
CPC .................................. *H04L 47/125* (2013.01)

(58) Field of Classification Search
CPC ...... H04L 9/3268; H04L 47/41; H04L 47/125
See application file for complete search history.

(56) References Cited

U.S. PATENT DOCUMENTS

| 5,884,040 | A | 3/1999 | Chung |
| 6,064,671 | A | 5/2000 | Killian |
| 6,157,950 | A | 12/2000 | Krishnan |
| 6,173,384 | B1 | 1/2001 | Weaver |
| 6,182,146 | B1 | 1/2001 | Graham-Cumming, Jr. |
| 6,253,230 | B1 | 6/2001 | Couland et al. |
| 6,263,368 | B1 | 7/2001 | Martin |
| 6,327,622 | B1 | 12/2001 | Jindal et al. |
| 6,330,602 | B1 | 12/2001 | Law et al. |

(Continued)

OTHER PUBLICATIONS

"Foundry Serveriron Switch Firewall Load Balancing Guide," Foundry Networks, Inc., Jun. 2003, 308 pgs.

(Continued)

*Primary Examiner* — Robert Wilson
(74) *Attorney, Agent, or Firm* — John W. Branch; Lowe Graham Jones PLLC

(57) ABSTRACT

A method and system is directed to distributing a flow of packets over a network to multiple traffic management devices. An apparatus receives each packet from a network and may act as a layer 2 switch, or router, to distribute the packet to one of a group of traffic management devices. The apparatus also may receive packets from servers for which the traffic management devices are managing communications. When distributing packets, a target traffic management device is selected from the group of traffic management devices. A connection key associated with the received packet and an identifier associated with the selected traffic management device are saved such that subsequent received packets in the flow of packets are delivered to the same traffic management device.

19 Claims, 9 Drawing Sheets

(56) References Cited

U.S. PATENT DOCUMENTS

| | | |
|---|---|---|
| 6,359,879 B1 | 3/2002 | Carvey et al. |
| 6,389,448 B1 | 5/2002 | Primak et al. |
| 6,424,992 B2 | 7/2002 | Devarakonda et al. |
| 6,453,360 B1 | 9/2002 | Muller et al. |
| 6,493,341 B1 | 12/2002 | Datta et al. |
| 6,546,423 B1 | 4/2003 | Dutta et al. |
| 6,601,084 B1 | 7/2003 | Bhaskaran et al. |
| 6,651,099 B1 | 11/2003 | Dietz et al. |
| 6,665,702 B1 | 12/2003 | Zisapel et al. |
| 6,742,045 B1 | 5/2004 | Albert et al. |
| 6,775,235 B2 | 8/2004 | Datta et al. |
| 6,788,692 B1 | 9/2004 | Boudreau et al. |
| 6,792,461 B1 | 9/2004 | Hericourt |
| 6,792,463 B1 | 9/2004 | Lamberton et al. |
| 6,807,179 B1 | 10/2004 | Kanuri et al. |
| 6,832,252 B1 | 12/2004 | Cieslak et al. |
| 6,880,089 B1 | 4/2005 | Bommareddy et al. |
| 6,909,713 B2 | 6/2005 | Magnussen et al. |
| 6,980,521 B1 | 12/2005 | Jarvis |
| 7,010,611 B1 | 3/2006 | Wiryaman et al. |
| 7,020,713 B1 | 3/2006 | Shah et al. |
| 7,051,066 B1 | 5/2006 | Albert et al. |
| 7,065,569 B2 | 6/2006 | Teraslinna |
| 7,088,710 B1 | 8/2006 | Johnson et al. |
| 7,089,328 B1 | 8/2006 | O'Rourke et al. |
| 7,102,996 B1 * | 9/2006 | Amdahl et al. ............... 370/230 |
| 7,769,873 B1 | 8/2010 | Mackie |
| 7,774,473 B2 | 8/2010 | Elving et al. |
| 8,004,971 B1 * | 8/2011 | Szabo et al. ................. 370/230 |
| 8,477,609 B1 | 7/2013 | Amdahl et al. |
| 8,553,542 B1 * | 10/2013 | Szabo et al. ................. 370/230 |
| 2002/0062372 A1 | 5/2002 | Hong et al. |
| 2002/0114326 A1 | 8/2002 | Mahalingaiah |
| 2002/0138616 A1 | 9/2002 | Basson et al. |
| 2002/0138618 A1 | 9/2002 | Szabo |
| 2003/0021230 A1 | 1/2003 | Kuo et al. |
| 2003/0229809 A1 | 12/2003 | Wexler et al. |
| 2004/0090919 A1 | 5/2004 | Callon et al. |
| 2005/0008017 A1 | 1/2005 | Datta et al. |
| 2005/0114186 A1 | 5/2005 | Heinrich |

OTHER PUBLICATIONS

Amendment to carrier Sense Multiple Access with Collision Detection (CSMA/CD) Access Method and Physical Layer Specifications—Aggregation of Multiple Link Segments, IEEE Std 802.3ad-2000, Mar. 30, 2000, pp. 1-173.
Decision on Petition Under 37 CFR §§ 1.927 & 1.181 of U.S. Pat. No. 7,102,996, U.S. Appl. No. 95/001,511, mailed Aug. 31, 2011.
Decision on Petition Under 37 CFR §§ 1.927 & 1.181 of U.S. Pat. No. 7,395,349, U.S. Appl. No. 95/001,510, mailed Aug. 31, 2011.
Decision on Petition Under 37 CFR §§ 1.927 & 1.181 of U.S. Pat. No. 7,697,427, U.S. Appl. No. 95/001,509, mailed Aug. 31, 2011.
Decision on Petition Under 37 CFR §§ 1.927 & 1.181 of U.S. Patent No. 7,702,809, U.S. Appl. No. 95/001,508, mailed Sep. 1, 2011.
F5 Networks, Inc , Big/ip Controller Administrator Guide, Version 3.1, 2000, pp. 1-291.
F5 Networks, Inc., BIG/ip Controller Getting Started Guide, Version 3.1, 2000, pp. 1-124.
F5 Networks, Inc., Big/ip Controller Reference Guide, Version 3.1, 2000, pp. 1-173.
F5 Networks, Inc., Big/ip Controller Release Note, Version 3.1, Apr. 28, 2000, pp. 1-7; http://support.f5.com/kb/en-us/archived_products/big-ip/releasenotes/product/reinotes3_1.
Foundry Networks, Inc., Application Note: Firewall Load Balancing with Serveriron, created Mar. 3, 2000, pp. 1-6; http://www.foundrynet.corn/pdf/an-firewall-load-bal.pdf.
Foundry Networks, Inc., Foundry Products, http://www.foundrynet.com/appnotes, archived on May 10, 2000, 1 page; http://replay.waybackmachine.org/20000510161749/http://www.noundrynet.com/appnotes.
Hewitt, J., et al. "Securities Practice and Electronic technology," Corporate Securities Series, New York, Law Journal Seminars-Press, Dec. 1, 1998, title page, bibliography page, pp. 4.29-4.30.
Hopps, C. "Analysis of an Equal-Cost Multi-Oath Algorithm", The Internet Soceity, Nov. 2000, pp. 1-8.
Moy, J., "OSPF Version 2", The Internet Society, Apr. 1998, pp. 1-53.
Official Communication for U.S. Appl. No. 10/119,433, mailed Mar. 30, 2006.
Official Communication for U.S. Appl. No. 10/119,433, mailed Jun. 14, 2006.
Official Communication for U.S. Appl. No. 10/644,692, mailed May 18, 2007.
Official Communication for U.S. Appl. No. 10/644,692, mailed Oct. 30, 2007.
Official Communication for U.S. Appl. No. 10/644,692, mailed Feb. 26, 2008.
Official Communication for U.S. Appl. No. 10/659,011 mailed Sep. 19, 2008.
Official Communication for U.S. Appl. No. 10/659,011 mailed Dec. 23, 2008.
Official Communication for U.S. Appl. No. 10/659,011 mailed May 27, 2009.
Official Communication for U.S. Appl. No. 10/659,011 mailed Dec. 28, 2009.
Official Communication for U.S. Appl. No. 10/659,011 mailed Jul. 19, 2010.
Official Communication for U.S. Appl. No. 10/659,011 mailed Oct. 5, 2010.
Official Communication for U.S. Appl. No. 10/659,011 mailed Dec. 23, 2010.
Official Communication for U.S. Appl. No. 10/659,011 mailed Feb. 23, 2011.
Official Communication for U.S. Appl. No. 10/659,011 mailed Mar. 29, 2011.
Official Communication for U.S. Appl. No. 11/469,843, mailed Apr. 1, 2009.
Official Communication for U.S. Appl. No. 11/469,843, mailed Nov. 17, 2009.
Official Communication for U.S. Appl. No. 11/469,843, mailed Feb. 1, 2010.
Official Communication for U.S. Appl. No. 11/929,603, mailed Aug. 25, 2009.
Official Communication for U.S. Appl. No. 11/929,603, mailed Feb. 16, 2010.
Official Communication for U.S. Appl. No. 12/723,567 mailed Oct. 7, 2010.
Official Communication for U.S. Appl. No. 12/723,567 mailed Apr. 15, 2011.
Official Communication for U.S. Appl. No. 12/723,567 mailed Sep. 6, 2012.
Official Communication for U.S. Appl. No. 12/723,567 mailed Feb. 22, 2013.
Official Communication for U.S. Appl. No. 12/723,576 mailed Apr. 11, 2012.
Official Communication for U.S. Appl. No. 12/723,576 mailed Oct. 26, 2012.
Official Communication for U.S. Appl. No. 12/723,576 mailed Feb. 20, 2013.
Official Communication for U.S. Appl. No. 95/001,508, mailed Feb. 14, 2011.
Official Communication for U.S. Appl. No. 95/001,508 mailed Dec. 10, 2011.
Official Communication for U.S. Appl. No. 95/001,508 mailed Aug. 14, 2012.
Official Communication for U.S. Appl. No. 95/001,508 mailed Feb. 22, 2013.
Official Communication for U.S. Appl. No. 95/001,509, mailed Feb. 14, 2011.
Official Communication for U.S. Appl. No. 95/001,509 mailed Dec. 9, 2011.
Official Communication for U.S. Appl. No. 95/001,509 mailed Sep. 19, 2012.

(56) References Cited

OTHER PUBLICATIONS

Official Communication for U.S. Appl. No. 95/001,509 mailed Feb. 22, 2013.
Official Communication for U.S. Appl. No. 95/001,510, mailed Feb. 4, 2011.
Official Communication for U.S. Appl. No. 95/001,510, mailed Nov. 14, 2011.
Official Communication for U.S. Appl. No. 95/001,510 mailed Jul. 30, 3012.
Official Communication for U.S. Appl. No. 95/001,510 mailed May 9, 2013.
Official Communication for U.S. Appl. No. 95/001,511, mailed Jan. 31, 2011.
Official Communication for U.S. Appl. No. 95/001,511 mailed Dec. 16, 2011.
Official Communication for U.S. Appl. No. 95/001,511 mailed May 5, 2012.
Official Communication for U.S. Appl. No. 95/001,511 mailed Sep. 19, 2012.
Official Communication for U.S. Appl. No. 95/001,511 mailed Dec. 3, 2012.
Order on Claim Construction (Part 1), United States District Court, Western District of Washington at Seattle; Case No. 2:10-CV-00654-MJP; filed Jul. 8, 2011.
Order on Claim Construction (Part 2), United States District Court, Western District of Washington at Seattle; Case No. 2:10-CV-00654-MJP; filed Aug. 9, 2011.
Petition Under 37 C.F.R. § 1.927 to Review the Examiner's Refusal to Order inter Partes Reexamination of U.S. Pat. No. 7,102,996, U.S. Appl. No. 95/001,511, filed Mar. 10, 2011.
Petition Under 37 C.F.R. § 1.927 to Review the Examiner's Refusal to Order Inter Partes Reexamination of U.S. Pat. No. 7,395,349, U.S. Appl. No. 95/001,510, filed Mar. 4, 2011.
Petition Under 37 C.F.R. § 1.927 to Review the Examiner's Refusal to Order Inter Partes Reexamination of U.S. Pat. No. 7,697,427, U.S. Appl. No. 95/001,509, filed Mar. 14, 2011.
Petition Under 37 C.F.R. § 1.927 to Review the Examiner's Refusal to Order Inter Partes Reexamination of U.S. Pat. No. 7,702,809, U.S. Appl. No. 95/001,508, filed Mar. 14, 2011.
Reardon, M. "A Smarter Session Switch: Arrowpoint's CS Session Switches Boast the Brains Needed for E=-Commerce," Data Communications, Jan. 1999, title page, pp. 3, 5, 18.
Request for Inter Partes Reexamination of U.S. Pat. No. 7,102,996, U.S. Appl. No. 95/001,511, flied Dec. 13, 2010.
Request for inter Partes Reexamination of U.S. Pat. No. 7,395,349, U.S. Appl. No. 95/001,510, filed Dec. 13, 2010.
Request for Inter Partes Reexamination of U.S. Pat. No. 7,697,427, U.S. Appl. No. 95/001,509, filed Dec. 13, 2010.
Request for Inter Partes Reexamination of U.S. Pat. No. 7,702,809, U.S. Appl. No. 95/001,508, filed Dec. 13, 2010.
Thaler, D., et al, "Multipath Issues in Unicast and Multicast Next-Hop Selection" The Internet Society, Nov. 2000, pp. 1-9.
Wolf et al., Design Tradeoffs for Embedded Network Processors, Washington University in St. Louis, Jul. 10, 2000, pp. 1-18.
Official Communication for U.S. Appl. No. 12/723,567 mailed Jul. 1, 2013.
Official Communication for U.S. Appl. No. 13/181,418 mailed Feb. 8, 2013.
Official Communication for U.S. Appl. No. 13/181,418 mailed Jun. 5, 2013.
Official Communication for U.S. Appl. No. 95/001,508 mailed May 14, 2013.
Official Communication for U.S. Appl. No. 95/001,509 mailed Aug. 1, 2013.
Official Communication for U.S. Appl. No. 95/001,509 mailed Sep. 25, 2013.

\* cited by examiner

METHOD AND SYSTEM FOR SCALING NETWORK TRAFFIC MANAGERS USING CONNECTION KEYS

CROSS-REFERENCE TO RELATED APPLICATIONS

The present patent application is a continuation of co-pending U.S. patent application Ser. No. 13/181,418 filed on Jul. 12, 2011; which is a divisional of U.S. patent application Ser. No. 10/659,011 filed on Sep. 10, 2003, now U.S. Pat. No. 8,004,971 issued on Aug. 23, 2011; which is a continuation-in-part of U.S. patent application Ser. No. 10/119,433 filed on Apr. 9, 2002, now U.S. Pat. No. 7,102,996 issued on Sep. 5, 2006; which claims priority to U.S. Provisional Patent Application Ser. No. 60/293,466 filed on May 24, 2001; wherein all of the foregoing applications are incorporated herein by reference in their entireties.

FIELD OF THE INVENTION

The present invention relates to computer network traffic, and in particular, to distributing network traffic associated with traffic management devices.

BACKGROUND

The Internet's core bandwidth continues to double every year. Some of this additional bandwidth is consumed as more and more users access the Internet. Other additional bandwidth is consumed as existing users increase their use of the Internet. This increase of Internet use translates into an increase in traffic directed to and from World Wide Web (WWW) servers and other Internet servers.

Replacing a WWW server with a WWW server of twice the capacity is a costly undertaking. Adding additional WWW servers is less costly but generally requires a distribution mechanism to spread the workload so that each virtual server performs work proportional to its capacity and the number of servers available to the traffic management device that is performing the distribution mechanism. As a result, a traffic management device may be required to store state information about connections and look at higher levels to maintain connections between servers and users.

This requirement for more sophisticated traffic management requires more processing. With a sufficient rate of requests, eventually a traffic management device may not be able to process traffic in a timely manner. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

The present invention now will be described more fully hereinafter with reference to the accompanying drawings, which form a part hereof, and which show, by way of illustration, specific exemplary embodiments by which the invention may be practiced. This invention may, however, be embodied in many different foul's and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification, the terms "connected" and "coupled," mean a direct connection between the things that are connected, or an indirect connection through one or more either passive or active intermediary devices or components. The meaning of "a," "an," and "the" include plural references. The meaning of "in" includes "in" and "on." The terms source port (number) and destination port (number) generally refers to source and destination numbers within a transport layer protocol of a TCP/UDP/IP based network and are typically associated with an application program executable on a computing system.

Briefly stated, the present invention is directed to a system and method for routing a flow of packets to one or more traffic management devices. One or more distributors may be employed to route the flow of packets. As the packets are received, a distributor extracts a connection key from at least one received packet in the flow of packets. If at least one traffic management device is associated with the extracted connection key, the distributor forwards the flow of packets to the traffic management device associated with the extracted connection key. If the extracted connection key is not associated with at least one traffic management device, the distributor selects another traffic management device to forward each received packet in the flow of packets. The other traffic management device may be selected by a variety of mechanisms, as described below. Moreover, the distributor may store the connection key and an identifier of the selected traffic management device. In one embodiment, the selected traffic management device associates a signal with the flow of packets. The distributor employs the signal to determine whether to store the connection key and identifier of the selected traffic management device, to forget the connection key, or to ignore the connection key associated with the flow of packets.

Illustrative Operating Environment

Figure 1:
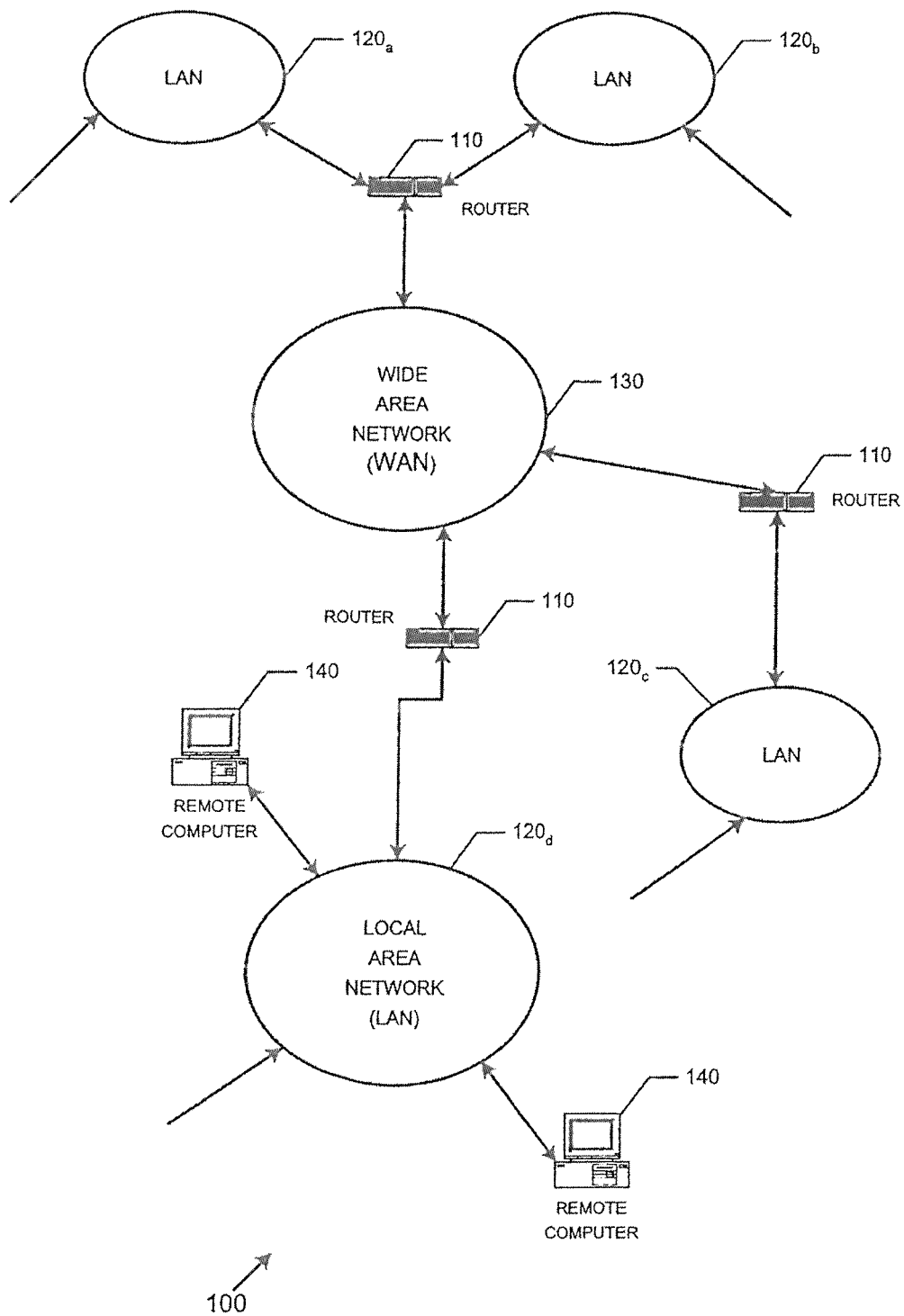
FIGS. 1-3 show components of an exemplary environment in which the invention may be practiced.
Figure 2:
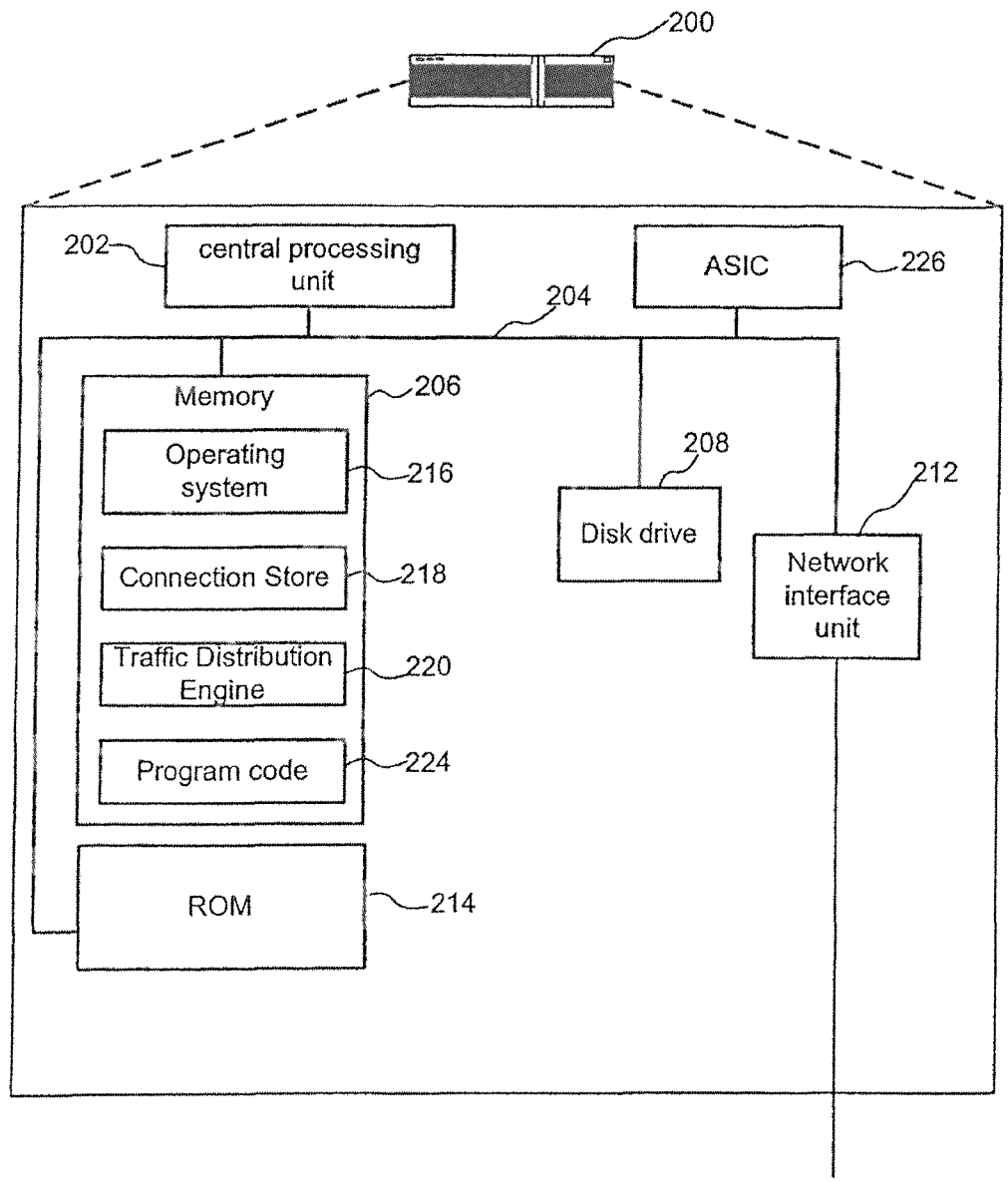
Figure 3:
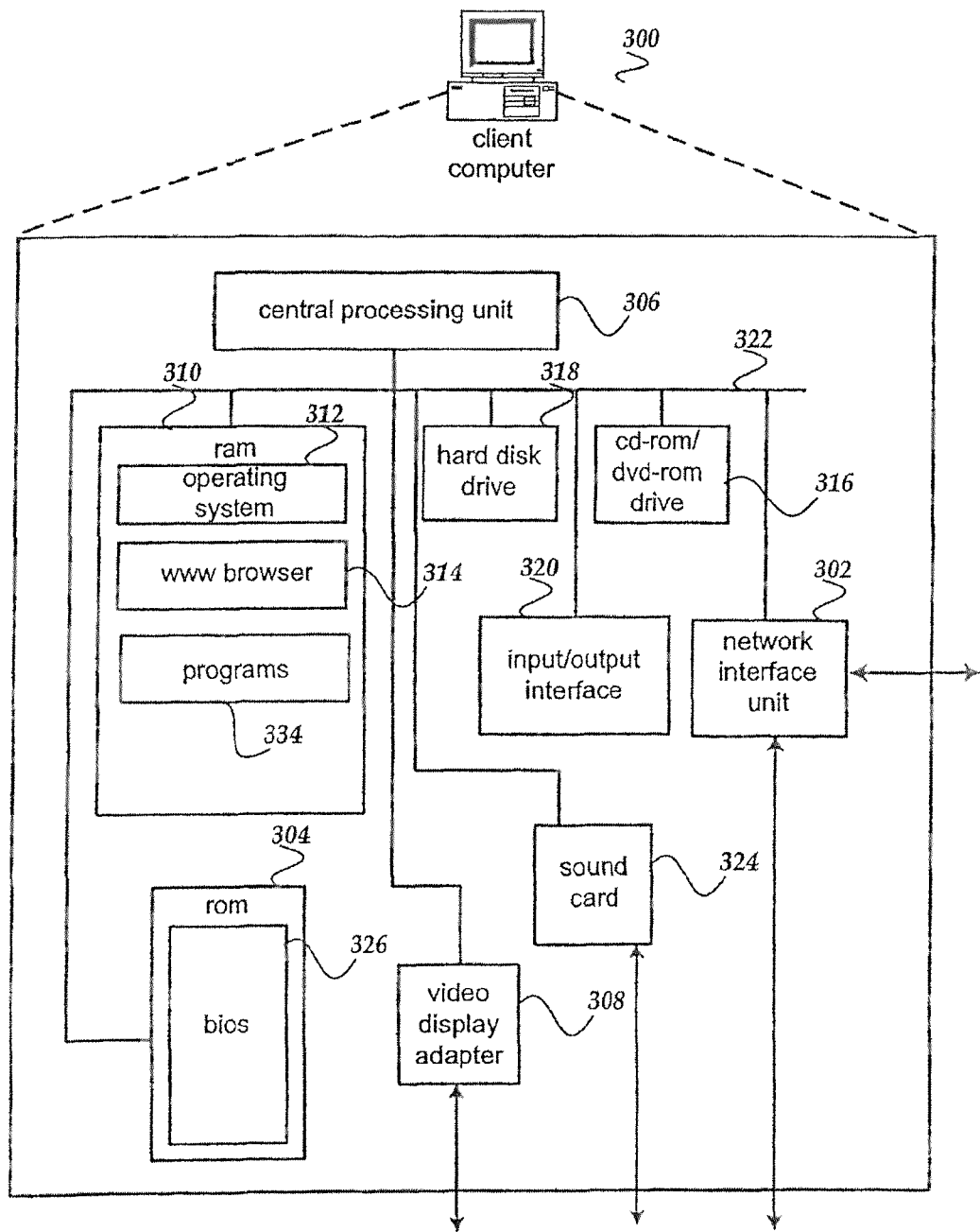

FIGS. 1-3 show components of an exemplary environment in which the invention may be practiced. Not all the components may be required to practice the invention, and variations in the arrangement and type of the components may be made without departing from the spirit or scope of the invention.

FIG. 1 shows one embodiment of wide area network/local area network (WAN/LAN) 100, in accordance with the present invention. WAN/LAN 100 includes a plurality of local area networks ("LANs") $120_{a-d}$ and wide area network ("WAN") 130 interconnected by routers 110. Routers 110 are intermediary devices on a communications network that expedite message delivery. On a single network linking many computers through a mesh of possible connections, a router receives transmitted messages and forwards them to their correct destinations over available routes. On an interconnected set of LANs—including those based on differing architectures and protocols—, a router acts as a link between LANs, enabling messages to be sent from one to another. Communication links within LANs typically include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known to those skilled in the art. Furthermore, computers, such as remote computer 140, and other related electronic devices can be remotely connected to either LANs $120_{a-d}$ or WAN 130 via a modem and temporary telephone link. The number of WANs, LANs, and routers in FIG. 1 may be increased or decreased arbitrarily without departing from the spirit or scope of this invention.

As such, it will be appreciated that the Internet itself may be formed from a vast number of such interconnected networks, computers, and routers. Generally, the term "Internet" refers to the worldwide collection of networks, gateways, routers, and computers that use the Transmission Control Protocol/Internet Protocol ("TCP/IP") suite of protocols to communicate with one another. At the heart of the Internet is a backbone of high-speed data communication lines between major nodes or host computers, including thousands of commercial, government, educational, and other computer systems, that route data and messages. An embodiment of the invention may be practiced over the Internet without departing from the spirit or scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

FIG. 2 shows an exemplary network device 200 that may operate as an intermediate network device in accordance with the present invention. It will be appreciated that not all components of network device 200 are illustrated, and that network device 200 may include more or fewer components than those shown in FIG. 2. Network device 200 may operate, for example, as a router, bridge, firewall, gateway, traffic management device (also referred to as a traffic manager), distributor, load balancer, server array controller, or proxy server. The communications may take place over the network 130, the Internet, a WAN, LAN, or some other communications network known to those skilled in the art.

As illustrated in FIG. 2, network device 200 includes a central processing unit (CPU) 202, mass memory, and a network interface unit 212 connected via a bus 204. Network interface unit 212 includes the necessary circuitry for connecting network device 200 to network 130, and is constructed for use with various communication protocols including the TCP/IP and UDP/IP protocols. Network interface unit 212 may include or interface with circuitry and components for transmitting messages and data over a wired and/or wireless communications medium. Network interface unit 212 is sometimes referred to as a transceiver.

The mass memory generally includes random access memory ("RAM") 206, read-only memory ("ROM") 214, and one or more permanent mass storage devices, such as hard disk drive 208. In one embodiment, at least a portion of memory 206 is fast RAM. The mass memory stores operating system 216 for controlling the operation of network device 200. The operating system 216 may comprise an operating system such as UNIX, LINUX™, or Windows™.

In one embodiment, the mass memory stores program code and data for implementing connection store 218, and program code and data for implementing traffic distribution engine 220, in accordance with the present invention. Connection store 218 may be implemented as a database, flat file, table, or the like. As such, connection store 218 may also be located on disk drive 208. The mass memory may also store additional program code 224 and data for performing the functions of network device 200.

In one embodiment, the network device 200 includes one or more Application Specific Integrated Circuit (ASIC) chips 226 connected to the bus 204. As shown in FIG. 2, the network interface unit 212 may connect to the bus through an ASIC chip. The ASIC chip 226 includes logic that performs some of the functions of network device 200. For example, in one embodiment, the ASIC chip 226 performs a number of packet processing functions, to process incoming packets. In one embodiment, the logic of traffic distribution engine 220 is performed by the ASIC chip 226. In one embodiment, the network device 200 includes one or more field-programmable gate arrays (FPGA) (not shown), instead of, or in addition to, the ASIC chip 226. A number of functions of the network device can be performed by the ASIC chip 226, by an FPGA, by the CPU 202 with the logic of program code stored in mass memory, or by a combination of the ASIC chip and the CPU.

Computer storage media may include volatile and nonvolatile, removable and non-removable media implemented in any method or technology for storage of information, such as computer readable instructions, data structures, program modules or other data. Examples of computer storage media include RAM 206, ROM 214, EEPROM, flash memory or other memory technology, CD-ROM, digital versatile disks (DVD) or other optical storage, magnetic cassettes, magnetic tape, magnetic disk storage or other magnetic storage devices, or any other medium that can store the information and that can be accessed by a computing device.

Network device 200 may also include an input/output interface (not shown) for communicating with external devices or users.

Network device 200 can also be implemented as one or more "blades" where the term "blade" refers to one of multiple electronic circuit boards or cards that are installed in a hardware chassis with a backplane. An exemplary blade may include one or more processors, volatile and non-volatile memory, interfaces suitable for communicating information to and from the blade, and other components for enabling the operation of one or more applications. A blade may also include a specialized interface for the backplane and other interfaces, such as a USB port, FIREWIRE port, serial port, RF interface, IR interface, Ethernet interface, IDE controller, and the like. An application running on a blade may employ any of these interfaces to communicate information to other applications running on other blades and/or devices coupled to the blade server. Network device 200 can also be implemented as a combination of blades and additional components in the chassis.

FIG. 3 depicts several components of client computer 300. Those of ordinary skill in the art will appreciate that client computer 300 may include many more components than those shown in FIG. 3. However, it is not necessary that those generally conventional components be shown in order to disclose an illustrative embodiment for practicing the present invention. As shown in FIG. 3, client computer 300 includes network interface unit 302 for connecting to a LAN or WAN, or for connecting remotely to a LAN or WAN. Those of ordinary skill in the art will appreciate that network interface unit 302 includes the necessary circuitry for such a connection, and is also constructed for use with various communication protocols including the TCP/IP protocol, the particular network configuration of the LAN or WAN it is connecting to, and a particular type of coupling medium. Network interface unit 302 may also be capable of connecting to the Internet through a point-to-point protocol ("PPP") connection or a serial line Internet protocol ("SLIP") connection as known to those skilled in the art.

Client computer 300 also includes BIOS 326, processing unit 306, video display adapter 308, and memory. The memory generally includes RAM 310, ROM 304 and a permanent mass storage device, such as a disk drive. The memory stores operating system 312 and programs 334 for controlling the operation of client computer 300. The memory also includes WWW browser 314, such as Netscape's NAVIGATOR® or Microsoft's INTERNET EXPLORER® browsers, for accessing the WWW. It will be appreciated that these components may be stored on a computer-readable medium and loaded into memory of client computer 300 using a drive mechanism associated with the computer-readable medium, such as a floppy disk drive (not shown), optical drive 316, such as a CD-ROM/DVD-ROM drive, and/or hard disk drive 318. Input/output interface 320 may also be provided for receiving input from a mouse, keyboard, or other input device. The memory, network interface unit 302, video display adapter 308, and input/output interface 320 are all connected to processing unit 306 via bus 322. Other peripherals may also be connected to processing unit 306 in a similar manner.

As will be recognized from the discussion below, aspects of the invention may be embodied on routers 110, on network device 200, on client computer 300, or on some combination of the above. For example, programming steps may be contained in programs 334 and/or programs 234. Distributing may be performed by one or more servers, such as server 200 or by specialized hardware on a router such as routers 110.

Illustrative Traffic Distributing Systems

Figure 4:
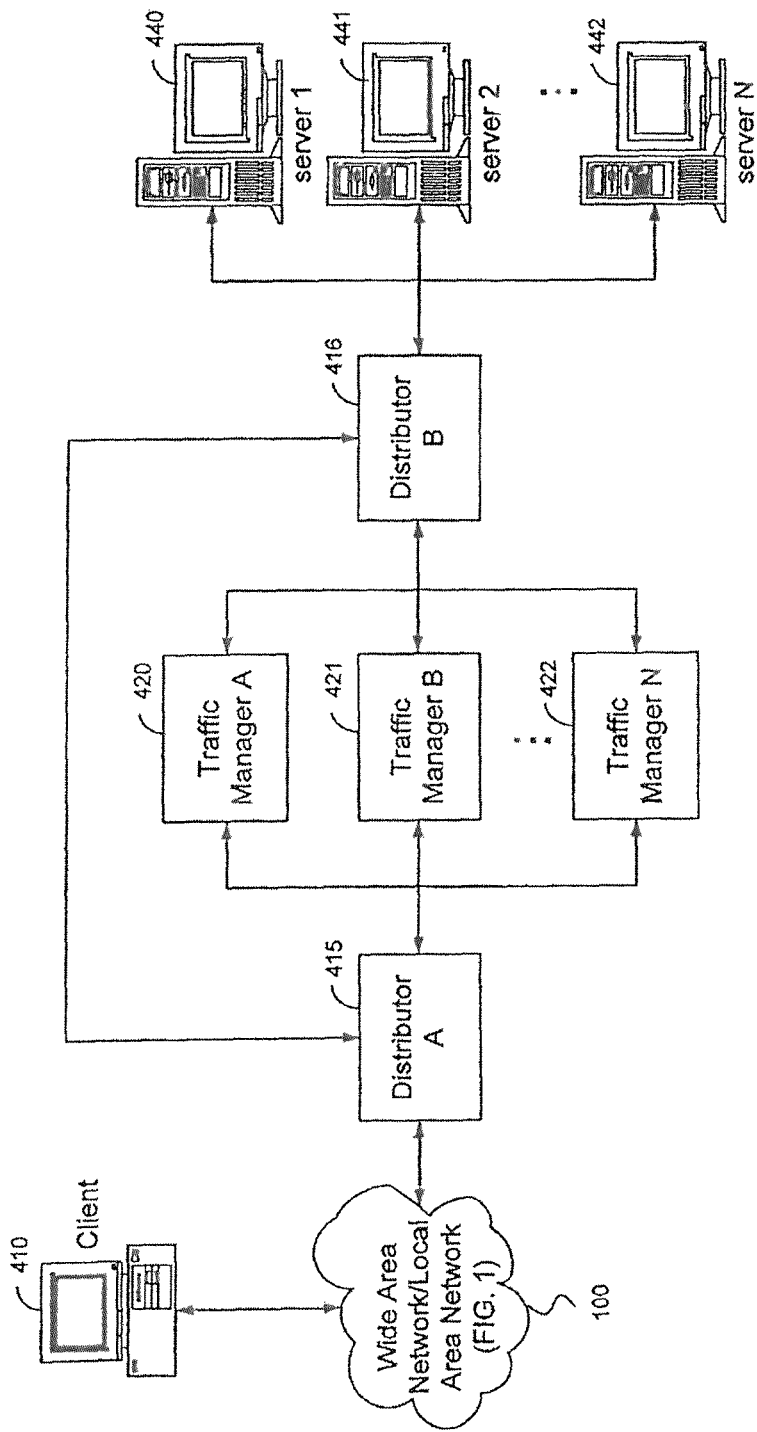
FIG. 4 illustrates an exemplary environment in which a system for distributing traffic to an array of traffic management devices operates.

FIG. 4 illustrates an exemplary environment in which a system for distributing traffic through an array of traffic management devices operates, according to one embodiment of the invention. The system includes client 410, distributors 415-416, traffic management devices 420-422, and origin servers 440-442.

Client 410 is coupled to distributor 415 over WAN/LAN 100. Distributor 415 is coupled to distributor 416 through traffic management devices 420-422. Distributor 415 also has a more direct connection to distributor 416. Distributor 416 is coupled to origin servers 440-442.

Client 410 is any device capable of connecting with WAN/LAN 100. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Alternatively, client 410 may be any device that is capable of connecting using a wired or wireless communication medium such as a PDA, POCKET PC, wearable computer, or other device mentioned above that is equipped to use a wired and/or wireless communications medium. An exemplary client that may connect with WAN/LAN 100 is client computer 300 of FIG. 3.

Distributor 415 receives information in the form of packets. Each packet may convey a piece of information. A packet may be sent for handshaking, i.e., to establish a connection or to acknowledge receipt of data. A communication includes a group of related packets sent between two devices, such as client 410 and origin server 440. For example, to request a Web page, client 410 may send some packets requesting a connection, e.g., handshaking packets; origin server 440 may respond with other handshaking packets. Then client 410 may send a packet requesting a particular Web page. Origin server 440 may respond by sending data packets associated with the Web page. Finally, client 410 may end a communication by sending some more handshaking packets which origin server 440 may respond to with other handshaking packets. In essence, a communication may be thought to include all packets needed or necessary for a transaction to occur. A communication or part of a communication may also be referred to as a flow or as a flow of packets.

As described above, a flow may include a bi-directional flow of packets. Bi-directional packet flows include packets sent from a client, such as client 410, that are destined for a server, such as origin server 440, and those packets sent from the server to the client.

A flow of packets may also include related packet flows, such as a control packet flow and a data packet flow that may arise during a File Transfer Protocol (FTP) session, or the like. A flow of packets might further include IP fragments that may arise either at the original sender of the packets, or at any intermediate device along a communication path.

Moreover, traffic management devices 420-422 may proxy TCP communications between a client and a server. The traffic management device may do this by terminating a client-side TCP connection with the client, and terminating a corresponding server-side TCP connection with the server. The packets within either the client-side TCP connection, or the packets within the server-side TCP connection may then be considered to be a flow. The combination of packets in both corresponding TCP connections may also be considered to be a flow. The packets received by the traffic management device within at least one of the TCP connections might be forwarded with the content unaltered, dropped, transformed, combined, split into multiple packets, and the like, and forwarded within the other TCP connection. Generally, packets are considered to be forwarded packets when they include data received in one TCP connection and are transmitted from the traffic management device in a corresponding TCP connection, even if the packets are modified, combined, split, and the like. For example, data within the packets may be split between multiple server-side TCP connections, and the like.

A packet may come from various senders including client 410, traffic management devices 420-422, distributor 416, or origin servers 440-442. The packet may include information such as a request, response, or configuration command. Generally, packets received by distributor 415 will be formatted according to TCP/IP, but they could also be formatted using another transport protocol, such as User Datagram Protocol (UDP), Internet Control Message Protocol (ICMP), NETbeui, IPX/SPX, token ring, and the like. Upon receipt of the packet, a transcoder (not shown) associated with distributor 415 may make a determination as to where the packet should go. The transcoder may be logic circuitry or software executing on an electronic device, such as a processor, within distributor 415, or it may execute or reside elsewhere. In one embodiment, the transcoder includes traffic distribution engine 224 shown in FIG. 2. The transcoder may access connection data, or other information to determine an action to perform upon receipt of the packet, or it may be "hardwired" to perform a certain action depending upon pre-defined conditions. In some senses, the transcoder may be viewed as the "brains" of distributor 415 or as logic, which drives the operation of distributor 415. In future references to distributors, the word transcoder may or may not be used. Furthermore, a distributor may be referred to as making decisions or determinations, but it should be understood in such references that a transcoder associated with the distributor may be making the decisions or determinations and causing the distributor to take action appropriately.

A user on client 410 may request, for example, a Web page associated with a URL, such as http://www.uspto.gov. If this is a Web page that is serviced by origin servers 440-442, distributor 415 forwards the request to one of traffic management devices 420-422. A user on client 410 may request communication specifically with one of the traffic managers. In this case, distributor 415 forwards the request to the specified traffic manager. For example, the user may wish to configure the traffic management device, install new software, provide maintenance, or some other activity. The user may wish to configure distributor 415. In this case, distributor 415 processes the communication itself. Distributor 415 may receive a response to a previous request from one of traffic management devices 420-422. Distributor 415 may then forward this request to the recipient by sending it to WAN/LAN 100. A user may send a message directed specifically at one of origin servers 440-442. In this case, distributor 415 may send the message to distributor 416 for relaying the message to the specified server.

When requests for content come to distributor 415, distributor 415 may be required to ensure that a request from the same source is sent through the same traffic management device. Distributor 415 (and distributor 416) may employ a variety of mechanisms to ensure that a request from the same source is sent through the same traffic management device. For example, distributor 415 (and distributor 416) may employ routing mechanisms such as those described in U.S. patent application Ser. No. 10/119,433, filed Apr. 9, 2002, which is hereby incorporated by reference.

The distributor 415 may also maintain connection data, among other things, about connections between origin servers 440-442 and requestors, such as client 410. Connection data may be saved in a connection store, such as connection store 218 shown in FIG. 2. In one embodiment, the connection data includes a connection key and identifier associated with at least one of the traffic management devices (420-422). The connection key may include information associated with a received packet, including, but not limited to, a source IP address, destination IP address, source port number, destination port number, and virtual local area network (VLAN) identifier. Distributor 415 may forward requests by employing connection data, as described in more detail in conjunction with FIG. 7.

Sometimes, when distributor 415 receives a packet, it acts like a router or switch, forwarding the packet toward the intended recipient. For example, distributor 415 may receive a request to connect with origin server 440. Distributor 415 may forward this request to distributor 416 for forwarding to origin server 440. Distributor 415 may receive the packet from distributor 416 or from traffic management devices 420-422 that is directed at a client, such as client 410. In this case, distributor 415 forwards the packet to WAN/LAN 100 (or a router thereon). Alternatively, if client 410 is a device distributor 415 is more closely connected to, distributor 415 may send the message directly to client 410.

Distributor 415 may employ a different mechanism for forwarding packets directed at traffic management devices 420-422 than for packets received from traffic management devices 420-422. For example, when packets are directed at traffic management devices 420-422, distributor 415 may extract a connection key from at least one received packet in the flow of packets. If the flow of packets includes fragmented packets, distributor 415 may assemble the packet fragments to extract the connection key. If the flow of packets includes related flows of packets, such as a control flow and a data flow, distributor 415 may extract connection data to form a unique connection key that is common across the related flows of packets.

Once the connection key is extracted, distributor 415 determines whether the connection key is associated with at least one traffic management device (420-422). If the connection key is associated with at least one traffic management device, distributor 415 may forward the flow of packets to that traffic management device (420-422).

Distributor 415 may select the traffic management device by employing a variety of mechanisms. For example, distributor 415 may select the traffic management device to balance a load across traffic management devices 420-422. Distributor 415 may employ any of several different load-balancing mechanisms. Such load-balancing mechanisms include, but are not limited to, round trip time (RTT), round robin, least connections, packet completion rate, quality of service, traffic management device packet rate, topology, global availability, hops, a hash of an address in a received packet, static ratios, and dynamic ratios. Moreover, mechanisms described in U.S. patent application Ser. No. 10/119, 433, entitled "Method and System for Scaling Network Traffic Managers," which is hereby incorporated by reference, may be employed to select the traffic management device to which the flow of packets are sent.

In one embodiment of the present invention, distributor 415 stores the connection key and identifier of the selected traffic management device when the traffic management device is selected. In another embodiment, distributor 415 receives a signal, such as described below, to determine how to manage the connection key and identifier of the selected traffic management device.

In yet another embodiment, distributor 415 stores the connection key and identifier of the selected traffic management device when the packet is received from the selected traffic management device.

Traffic management devices 420-422 receive messages sent from distributors 415 and 416. In some operations, traffic management devices 420-422 act like level 7 switches. That is, they may look at content associated with higher TCP/IP layers of the message, e.g. a request for a page such as http://www.uspto.gov/ and information that identifies the user, such as a cookie, etc. They may store information in memory so that next time the requestor requests more information from http://www.uspto.gov/, each request is sent to the same server. They may do this, in part, to ensure that the user is connected to the server that the user previously connected to. This helps prevent the loss of transaction data, such as items in a shopping cart.

In addition, traffic management devices 420-422 may perform network address translation (NAT). That is, in a TCP/IP packet, they may change the source and/or destination field. This may be done for many reasons. One reason is that each traffic management device is configured to cause future communications to and from a server to flow through the traffic management device, so that the traffic management device may maintain state information about the connection. The traffic management device may need state information to gracefully close a connection if, for example, the server fails. In addition, the traffic management device may need state information to reroute a connection to another server if the server fails. Another reason the traffic management device may be configured to have all future communications flow through it is for security purposes.

For example, if a server, such as origin server 440, requested stock information from a stock server (not shown) connected to WAN/LAN 100, the server would give its IP address as the source address so that the stock server would know where to respond to. The traffic management device through which the request travels, for example, traffic management device 420, could replace the source IP address of the request with an IP address associated with traffic management device 420 so that the stock server would respond to distributor 415 instead of origin server 440. Provided that distributor 415 routes the response from the stock server through traffic manager 420, this allows traffic management device 420 to maintain state information, provide security, and gracefully shut down or transfer a connection between the stock server and origin server 440.

Moreover, traffic management devices 420-422 may associate a signal with the received packet. In another embodiment, traffic management devices 420-422 may associate the signal with a different packet. The signal may include one or more bits within the packet that provides distributors 415-416 guidance on how to manage the flow of packets. In one embodiment, the signal directs the receiving distributor (416, or 415) to memorize the connection key and traffic management device's identifier associated with the received packet. The signal may also direct the receiving distributor to forget the connection key and traffic management device's identifier associated with the received packet, to ignore the connection key associated with the received packet, or the like.

Traffic management devices may also determine which packet flows are considered a related packet flows. A traffic management device may determine that two packet flows are related and communicate such information to a distributor, such as distributors 415-416.

Traffic management devices, such as traffic management devices 420-422, are any devices that manage network traffic. Such devices include, for example, routers, proxies, firewalls, load balancers, devices that perform network address translation, any combination of the preceding devices, and the like. A traffic manager may, for example, control the flow of data packets delivered to and forwarded from an array of application servers, such as Web servers. A traffic manager may direct a request for a resource to a particular Web server based on network traffic, network topology, capacity of the server, content requested, and a host of other load balancing metrics. A traffic manager may receive data packets from and transmit data packets to the Internet, an intranet, or a local area network accessible through another network. A traffic manager may recognize packets that are part of the same communication, flow, and/or stream and may perform special processing on such packets, such as directing them to the same server so that state information is maintained. A traffic manager may support a wide variety of network applications such as Web browsing, email, telephony, streaming multimedia, and other traffic that is sent in packets.

A traffic management device may be implemented using one or more personal computers, POCKET PCs, wearable computers, multiprocessor systems, microprocessor-based or programmable consumer electronics, network PCs, cell phones, smart phones, pagers, walkie talkies, radio frequency (RF) devices, infrared (IR) devices, CBs, integrated devices combining one or more of the preceding devices, and the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets. An exemplary device that could be used as a traffic management device is server computer 200 of FIG. 2, configured with appropriate software. A traffic management device may have multiple network interface units and each network interface unit may interface with one or more networks. It should be understood that traffic manager as it is used in this document means traffic management device.

Distributor 416 receives communications and forwards them to one or more of origin servers 440-442, to distributor 415, or to traffic management devices 420-422. When delivering packets to traffic management devices 420-422, distributor 416 may be configured so that the traffic management device that sent the packet to a particular server receives the server's response.

Distributor 416 may employ connection data substantially like distributor 415, to determine which traffic management device to forward the packet. For example, distributor 416 may determine whether a connection key associated with at least one packet in the flow of packets is associated with a traffic management device. If the connection key is associated with a traffic management device, distributor 416 is configured to forward the flow of packets to that traffic management device.

When receiving packets from traffic management devices 420-422, distributor 416 is configured to store an identifier associated with the sending traffic management device and the connection key associated with the received packets.

In one embodiment, when receiving packets from traffic management devices 420-422, distributor 416 is configured to receive a signal that indicates how to manage the packets. The signal may direct distributor 416 to store the connection key and identifier associated with the sending traffic management device. The signal may also direct distributor 416 to forget an existing connection key, ignore the connection key associated with the received packet, age an existing connection key, or the like. Aging an existing connection key enables distributor 416 (and 415) to delete connection data that is not accessed for some time. This may arise, for example, when the client (or origin server) has terminated a communication.

Distributor 416 may also act as a switch or router in relaying messages to intended recipients. Although distributor 416 is shown as having one shared communications link (segment) going between it and origin servers 440-442, it may have dedicated communications links to each of origin servers 440-442.

Origin servers 440-442 may include one or more WWW servers, such as server 200 of FIG. 2, or other general-purpose servers. Origin servers 440-442 may serve content for more than one vendor. For example, a group of vendors may each run their Web sites using one or more origin servers 440-442. Origin servers 440-442 may perform other services besides serving Web pages.

Figure 5:
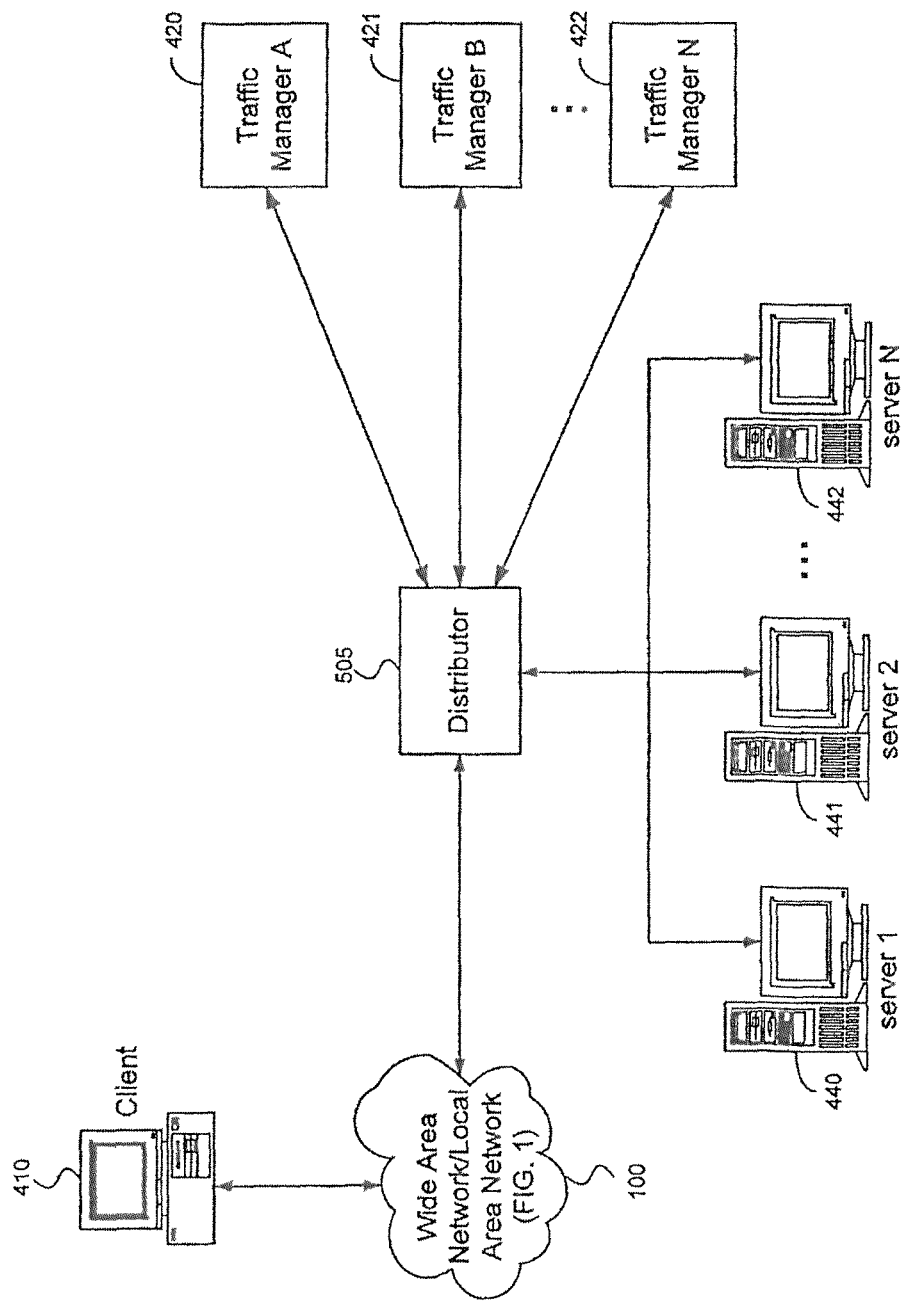
FIG. 5 shows another exemplary environment in which a system for distributing traffic to an array of traffic management devices operates.

FIG. 5 shows another exemplary environment in which a system for distributing traffic through an array of traffic management devices operates, according to one embodiment of the invention. The system includes client 410, distributor 505, traffic management devices 420-422, and origin servers 440-442.

Client 410 is coupled to distributor 505 over WAN/LAN 100. Distributor 505 is coupled to traffic management devices 420-422 and origin servers 440-442.

Components numbered similarly to those in FIG. 4 operate similarly. A difference between the environment shown in FIG. 5 and that shown in FIG. 4 is that the functionality of distributors 415-416 has been combined in distributor 505. In addition, distributor 505 is shown as having dedicated communication links (segments) to each of origin servers 440-442. It will be understood that distributor 505 may also be configured to have more than one traffic management device connected to each communication link.

Similarly, although FIG. 5 shows each of origin servers 440-442 sharing a communications link, each server may be placed on its own dedicated communication link or paired with one or more other servers without departing from the spirit or scope of the invention.

In general, distributor 505 operates logically like the combination of distributors 415 and 416. A packet that is sent from client 410 addressed to a server, such as server 440, may be routed to the server rather than passing through a traffic management device or a second distributor. Likewise, a packet sent from a server to the client may be forwarded to the client from the distributor rather than passing the packet through a traffic management device or a second distributor.

Similarly, distributor 505 may employ connection data for use in forwarding packets to traffic management devices 420-422 substantially as described above, in conjunction with FIG. 4.

The configuration of FIG. 5 may be used for various reasons including to lower costs (of providing two distributors) or because a system does not need the capacity of two distributors.

Figure 6:
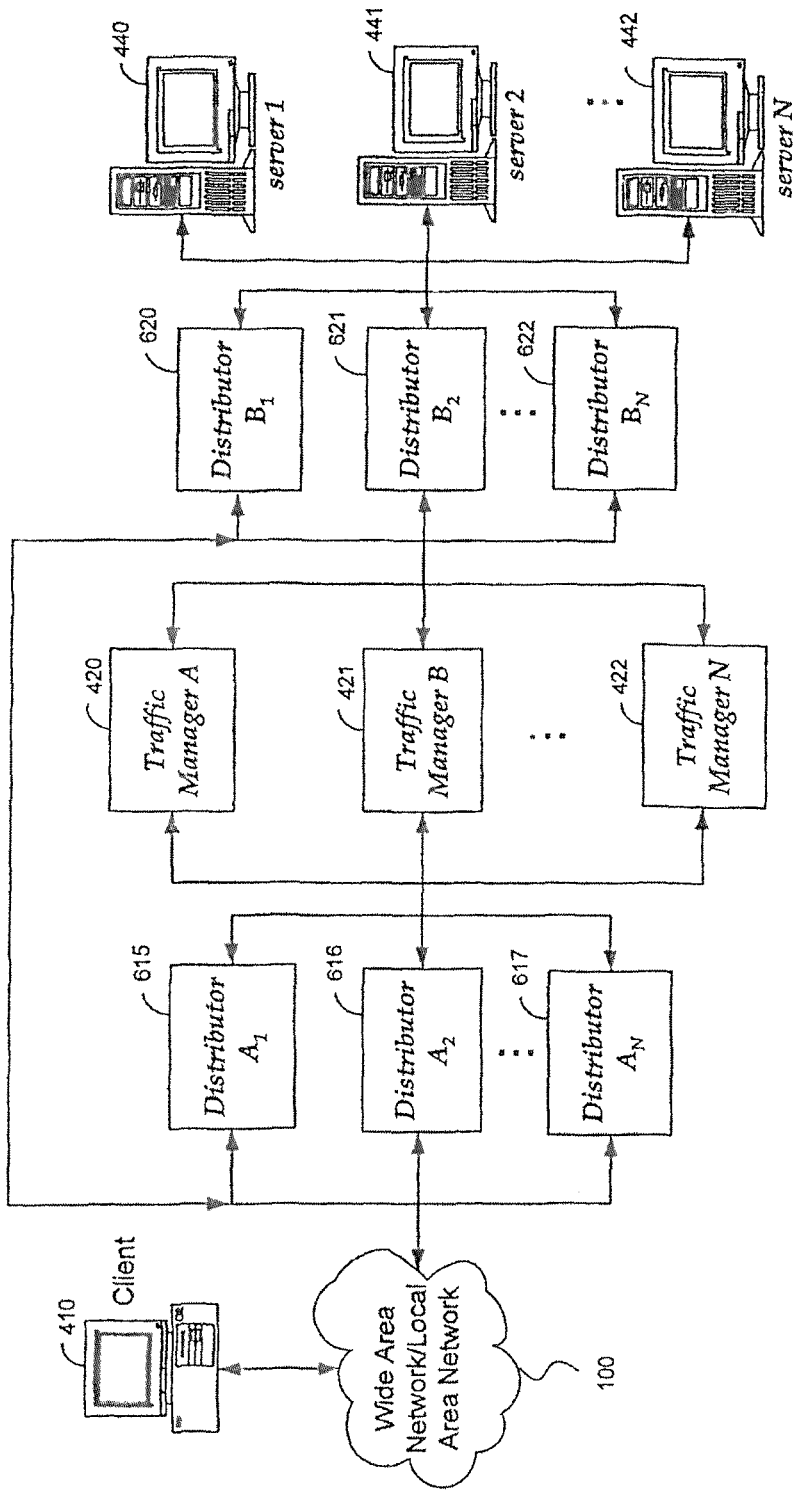
FIG. 6 shows yet another exemplary environment in which a system for routing traffic through an array of traffic management devices operates.

FIG. 6 shows yet another exemplary environment in which a system for routing traffic through an array of traffic management devices operates, according to another embodiment of the invention. The system includes client 410, distributors 615-617 and 620-622, traffic management devices 420-422, and origin servers 440-442.

Client 410 and distributors 615-617 are each coupled to each other over WAN/LAN 100. Distributors 615-617 are coupled to each other. Distributors 620-622 are coupled to each other. Moreover, distributors 615-617 are coupled to and in communication with distributors 620-622. In one embodiment, distributors 620-622 are coupled serially to each other. In another embodiment, distributors 615-617 are also coupled serially to each other.

Components numbered similarly to those in FIG. 4 operate similarly. A difference between the environment shown in FIG. 6 and that shown in FIG. 4 is that the functionality of distributors 415 and 416 are distributed across distributors 615-617 and distributors 620-622, respectively, in a manner that provides for link aggregation. Link aggregation may be viewed as a binding together of two or more data channels into a single data channel that appears as a single, higher-bandwidth logical link. Such link aggregation is sometimes referred to as load balancing of multiple communication links since traffic loads may be distributed across multiple links to one or more distributors (615-617, and 620-622). In general, link aggregation enables distributors 615-617 (and 620-622) to provide for asymmetric level 2, and level 3-packet routing. Moreover, link aggregation provides redundancy should one of the distributors or network links fail. Link aggregation may cause asymmetric packet routing, resulting in packets on substantially the same bi-directional flow to enter on one distributor and exit on a second distributor. Moreover, substantially similar principles apply for asymmetric routing at layer 3 packet routing.

To accomplish redundancy, distributors 615-617 are configured to mirror connection data by sharing learned connection data and related signals among each other. For example, should distributor 615 learn of connection data from a traffic management device, distributor 615 is configured to send the connection data to distributors 616 and 617. Similarly, distributors 620-622 are also configured to mirror connection data by sharing learned connection data and related signals among each other. Distributors 615-617 may also communicate with distributors 620-622 in substantially the same manner.

In one embodiment, distributors 615-617 are implemented by a multiprocessor device having a shared memory. Employing shared memory across the multiprocessor device may eliminate the need to mirror the shared learned connection data.

In FIG. 6, it may also be possible and useful in some situations for distributors 615-617 to signal distributors 620-622 for an associated translated flow, via the traffic management device. These signals could include ageing, deletion, creation, and the like. This may be useful in situations, such as where the traffic management device may not be aware that a distributor exists, and the distributor may be handling the ageing, deletion, and creation of associations between connection keys and traffic management device. The traditional mirroring mechanism discussed elsewhere might not do this, as the mirroring mechanism typically mirrors only the same flow key. The association between the pair of flow keys consisting of the original flow key and the associated translated flow key might only be known by the traffic management device. Thus, signals that are to be sent from one distributor to the associated translated flow might be sent through the traffic manager. An example of an associated translated flow is a NAT translation from original to NAT address. It results in two flows: the original and the associated translated flow. Typically, only the traffic management device is aware of the relationship between these two flows.

Illustrative Method of Distributing Traffic

Figure 7:
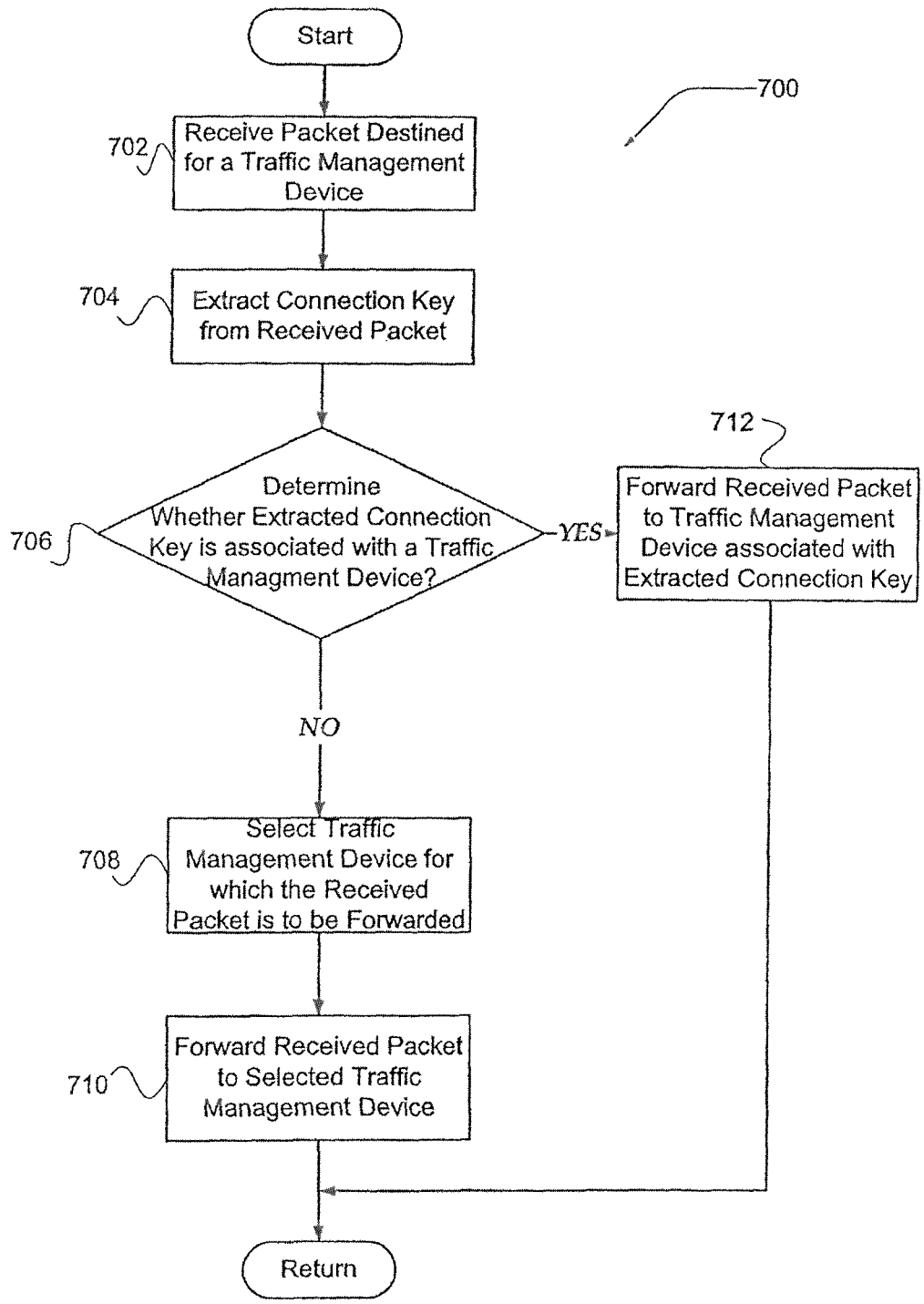
FIG. 7 illustrates a flow chart for forwarding a flow of packets to a traffic management device.

FIG. 7 illustrates a flow chart for forwarding a flow of packets to a traffic management device, according to one embodiment of the invention. Process 700 starts after it is determined that the packets are directed to the network upon which the traffic management device is located.

At block 702, a distributor receives a packet in the flow of packets. In one embodiment, the received packet is a first packet in a flow of packets. In another embodiment, where the flow of packets includes packet fragments, block 702 may receive several packets that may be temporarily saved in a buffer, memory, or the like. In yet another embodiment, a traffic management device, or other device, may be configured to handle packets that are determined to not contain a full connection key.

Referring to FIG. 4, the received packet may be sent from client 410 requesting information from origin servers 440-442. The received packet may also be sent from origin servers 440-442, destined for client 410. Thus, as shown in FIG. 4, process 700 may be deployed in distributor 415 and 416.

Processing proceeds to block 704, where a connection key is extracted from at least one received packet in the flow of packets. In one embodiment, a source IP address, destination IP address, source port number, virtual local area network (VLAN) identifier, and destination port number are extracted from the received packet to form a unique connection key associated with the received packet. However, the present invention is not so limited, and additional packet data or other combinations of packet data may be employed to form the unique connection key. For example, in another embodiment, extraction of a destination IP address, a destination port number, and a VLAN identifier from the received packet forms a connection key associated with an FTP flow.

When the flow of packets includes packet fragments, each fragment may act as its own packet, with its own IP header. Thus, at block 704, if it is determined that the flow of packets includes packet fragments, the packet fragments may be obtained from the buffered area described at block 702 and reassembled prior to forming the connection key. A designated traffic management device, another device, or the like may reassemble packets with less than a full connection key.

Related packet flows may include different connection data in each of the related flows. For example, while a control flow and a data flow in an FTP session may include the same IP address they may also include different TCP port numbers. In a typical FTP session, two logical paths are established, one for control flows through TCP port number 21, and another for data flows through TCP port number 20. The control path is typically established prior to the data flow, and employed throughout the FTP session. Thus, a related packet flow in a typical FTP session may be determined by the control flow. Therefore, at block 704, if it is determined that the flow of packets includes related packet flows, connection data is extracted from the related flows to form a connection key that may become common to both related flows. For example, with an FTP session, the connection key may include the IP addresses data that is common between the control flow and the data flow. This enables the present invention to forward related packet flows to the same traffic management device. It is noted, however, that the invention is not so limited. For example, the connection key need not include the source IP address.

Processing continues to decision block 706, where a determination is made whether the extracted connection key is associated with a traffic management device. In one embodiment, this is determined by searching the connection store for a match on a stored connection key. If a match is found, processing branches to block 712. Alternatively, if at least one stored connection key is not located that matches the extracted connection key processing branches to block 708.

At block 712, if at least one stored connection key matches the extracted connection key, the received packet is forwarded to the traffic management device that is associated with the stored connection key (and the extracted connection key). Upon completion of block 712, the processing returns to perform other actions.

Alternatively, at block 708, if no stored connection key matches the extracted connection key, a traffic management device is selected for which the received packet is to be forwarded. The traffic management device may be selected based a variety of mechanisms, as described above in conjunction with FIG. 4. For example, the traffic management device may be selected to balance loads across a plurality of traffic management devices. Moreover, the traffic management device may be selected based on mechanisms described in U.S. patent application Ser. No. 10/119,433, entitled "Method and System for Scaling Network Traffic Managers," filed Apr. 9, 2002, which is hereby incorporated by reference. One such mechanism described in the incorporated reference selects the traffic management device based in part on a hash of a destination (or source) address of the received packet, if the packet includes a source (or destination) address associated with a set of addresses.

In one embodiment, at block 708, an identifier associated with the selected traffic management device and the extracted connection key is stored in the connection store.

Processing continues to block 710, where the received packet is forwarded to the selected traffic management device. Upon completion of block 710, the processing returns to perform other actions.

Although not illustrated in FIG. 7, block 704, and an associated decision block, substantially similar to 712, may be performed for various connection key configurations. For example, in one embodiment, a general connection key may be extracted at block 704, above, where the general connection key may include a source IP address, a source port, a destination IP address, a destination port, and a VLAN identifier. Then if at block 712, a match is found, processing continues to block 712. However, if a match is not found, then a less specific connection key may be extracted. The less specific connection key may include, for example, an FTP connection key. The FTP connection key may include a destination IP address, a destination port, and a VLAN identifier. If a match is found for the less specific connection key, processing may continue to block 712; however, if no match is found, a third connection key (fourth connection key, and so forth) may be extracted and a match determined.

Figure 8:
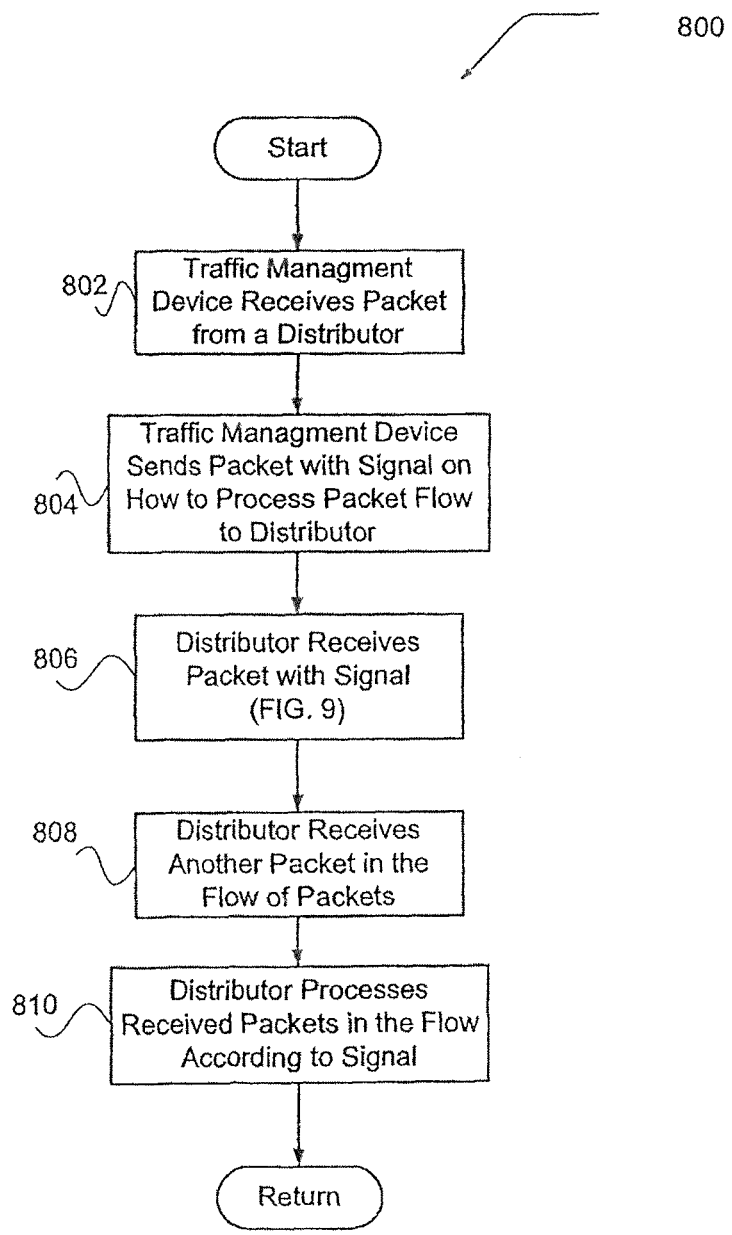
FIG. 8 illustrates a flow chart of a process for a traffic management device to instruct a distributor how to process a flow of packets.

FIG. 8 illustrates a flow chart of a process for a traffic management device to instruct a distributor how to process a flow of packets. Referring to FIG. 4, process 800 may represent a flow of packets from distributor 415 to traffic management device 420, and then to distributor 416. Process 800 may also represent a return flow of packets from distributor 416 to traffic management device 420 and then to distributor 415. Referring to FIG. 5, process 800 may further represent a flow of packets between distributor 505 and traffic management device 420.

Processing begins at block 802, where a traffic management device receives a packet in the flow of packets from a distributor. For example, referring to FIG. 4, distributor 415 may select to send the packet to traffic management device 420, based in part on a load balancing mechanism, such as described above.

Processing continues to block 804, where the traffic management device provides a distributor with a signal on how to process the packet flow for which the packet is associated. In one embodiment, the signal is communicated to the distributor through an out of band process. In another embodiment, the signal is associated with the received packet. In still another embodiment, the signal is associated with a different packet. Referring briefly to FIG. 4, in our example, traffic management device 420 provides the signal to distributor 416, distributor 415, and to both distributors 415-416.

The signal may include one or more other signals that instruct a distributor on how to process the packets in the flow of packets. Such instruction includes, but is not limited to, directing a distributor to memorize the identifier associated with the present traffic management device and the connection key, forgetting an existing connection key, aging a connection key, ignoring the connection data associated with the received packet, or the like. An aging signal may direct the distributor to start a timer associated with the connection data, such that after a pre-determined period of time, the connection data is deleted from the connection store. In this manner, an additional signal directing the distributor to forget the connection data is not required.

Processing continues to block 806, where the distributor receives the packet with the signal. The distributor may process the packet based in part on the signal provided. In one embodiment, the distributor processes the packet as described below in conjunction with FIG. 9.

Processing continues to block 808, where the distributor receives another packet in the flow of packets. Referring to FIG. 4, distributor 416 may receive a reply packet in the flow of packets from server 440. Similarly, distributor 415 in FIG. 4 may receive another packet from client 410. Processing proceeds to block 810.

At block 810, the distributor processed each received packet in the flow of packets according to the signal received at block 806. For example, distributor 416 may employ connection data that was stored based in part on the signal received at block 806, to forward the reply packet to a traffic management device. Similarly, distributor 415 might forward the client's other packet to a traffic management device according to the connection data that was stored based in part on the received signal. Upon completion of block 810, processing returns to perform other actions.

Figure 9:
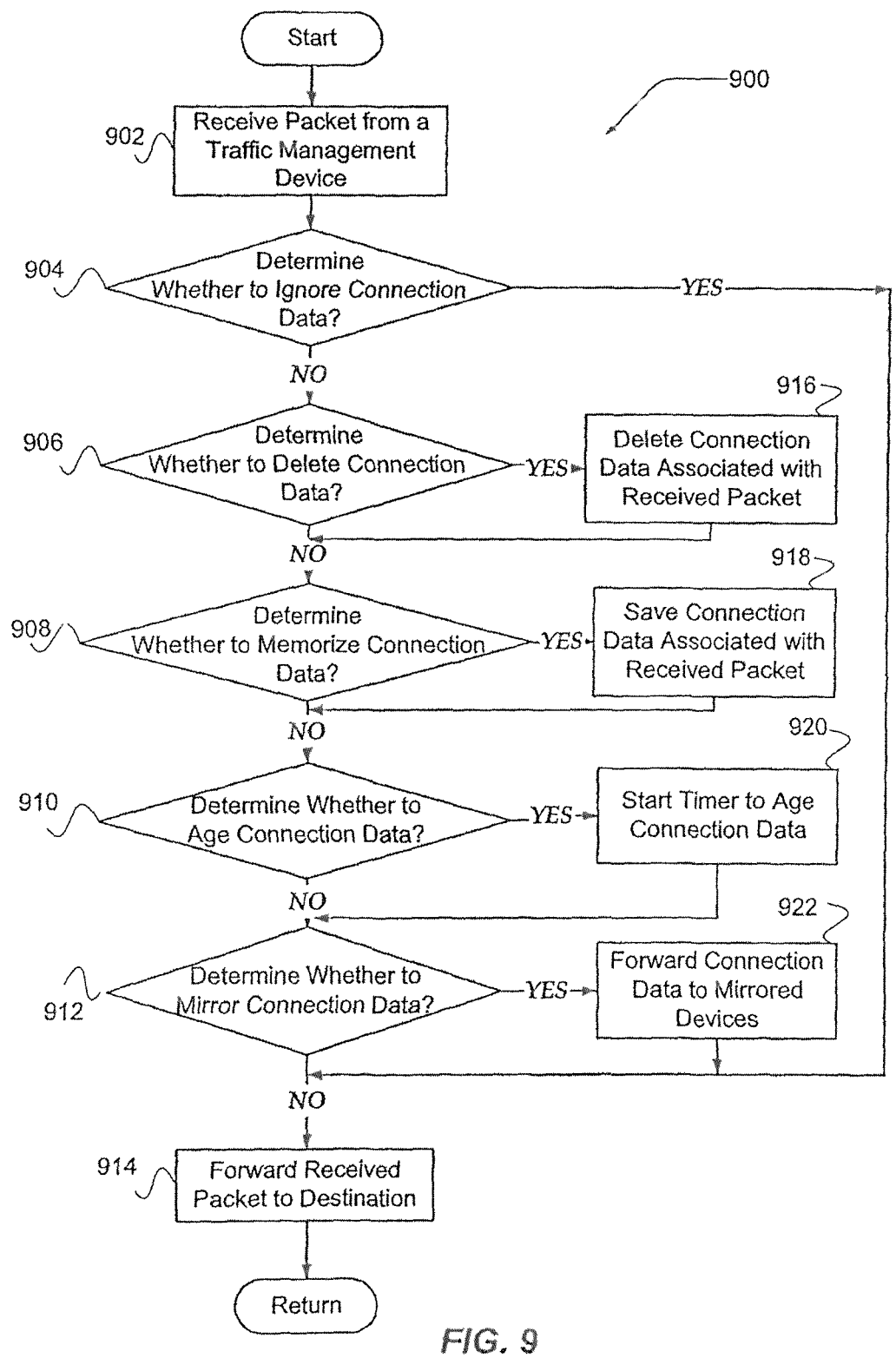
FIG. 9 shows a flow chart for managing packets received from a traffic management device, according to one embodiment of the invention.

FIG. 9 shows a flow chart for processing packets received from a traffic management device, according to one embodiment of the invention. Processing begins at block 902, where the packet is received from the traffic management device.

Processing continues to decision block 904, where a determination is made whether the connection data associated with the received packet is to be ignored. Connection data may be ignored when a signal, or the like, associated with the received packet indicates an "Internet Control Message Protocol (ICMP) port unavailable" message, error message, or the like. In any event, if it is determined that the connection data is to be ignored, processing branches to block 914; otherwise, processing branches to decision block 906.

At decision block 906, a determination is made whether the connection data associated with the received packet is to be deleted. Connection data may be deleted for example, when a signal, or the like, associated with the received packet indicates a reset message, a delete command, and the like. If the connection data is to be deleted, processing branches to block 916; otherwise, processing branches to decision block 908. At block 916, the connection data associated with the received packet is deleted from the connection store. Processing continues to decision block 908.

At decision block 908, a determination is made whether the connection data associated with the received packet is to be memorized. If the connection data is to be memorized, processing proceeds to block 918; otherwise, processing continues to decision block 910. At block 918, the connection key and identifier associated with the forwarding traffic management device are saved in the connection store. Processing continues to decision block 910.

At decision block 910, a determination is made whether to age the connection data indicated by the signal. If the connection data is to be aged, processing branches to block 920; otherwise, processing branches to decision block 912. At block 920, a timer, or the like, associated with indicated connection data is initialized. When a pre-set time is reached on the timer, the indicated connection data is deleted from the connection store. Processing continues to block 912.

At decision block 912, a determination is made whether to mirror the connection data. Mirroring of the connection data may arise when distributors are arranged to provide link aggregation, redundancy, or the like. Mirroring may also include mirroring of information indicating that connection data is to be deleted. If it is determined that information associated with the connection data for the received packet is to be mirrored, processing branches to block 922; otherwise processing branches to block 914.

At block 922, the connection data and any signals associated with the received packet are forwarded to the mirroring device, where the mirroring device may operate on the connection data and signal in a manner substantially similar to the mirrored device. Processing continues to block 914.

At block 914, the received packet is forwarded to a destination, such as client 410, distributor (415-416), or origin server (440-442) shown in FIG. 4. Upon completion of block 914, processing return to the calling process.

In alternate embodiments of the invention, related flows of packets, such as a client side flow and a server side flow, may be managed employing various mechanisms. For example, a traffic management device may receive packets from one of a related flow of packets. For this example, a client side flow is used as the first flow, though this is not required. The traffic management device generates a connection key from the received packet, and transmits a signal to a distributor, instructing the distributor to store an association between the connection key and the traffic management device. The traffic management device may then generate a server-side connection key corresponding to the related server-side flow. This may occur even though the traffic management device has not yet received a packet from the server-side flow. The traffic management device may do this because, from the client-side flow, it has knowledge of some of the fields from the second flow. For example, the source IP address and source port number from the client-side flow might be the destination IP address and destination port number from the server-side flow. However, the traffic manager might not yet know what the source port number will be for a packet coming from the server in the server-side flow. The server-side connection key may be referred to as a partial connection key, since it does not use all of the fields of a subsequent connection key.

In the example, the traffic management device transmits the partial server-side connection key to a distributor. The distributor uses the association between the partial server-side connection key and the traffic management device to forward packets of the server-side flow. The distributor learns a second server-side connection key, which may employ fields previously unknown. Upon learning of the second server-side connection key, the distributor may store the association between this key and the traffic management device for use in forwarding packets of the server-side flow. The distributor may also delete the partial server-side connection key.

There are a number of approaches in which the distributor may learn of the second server-side connection key. In one embodiment, the distributor learns the key when it receives packets that match the partial connection key. These packets may contain one or more fields that were previously missing from the partial connection key. The distributor then learns the key by generating it from the packets.

In another embodiment, the traffic management device learns the second connection key when it receives packets from the server-side flow. The traffic management device then transmits the second connection key to the distributor. The distributor receives the connection key, and stores it as described above.

Though discussed above with reference to the client-side flow as the first flow and the server-side flow as the related flow, the process can also occur with the server-side flow as the first flow and the client-side flow as the related flow. It can also occur with a control flow as the first flow and a corresponding data flow as the related flow. In this instance, the traffic management device might know the source and destination IP addresses from the first flow, but not the source port number.

Additionally, another embodiment of the above figures includes a decision as to whether to age a connection key, at least partly based on one or more signals within one or more packets of the corresponding packet flow. For example, in response to observing a finished (FIN) signal in packets of both directions of a flow, a decision might be made to age the corresponding connection key. In another example, in response to observing a reset (RST) signal in a TCP packet, a decision might be made to delete the corresponding connection key.

In another embodiment of the above figures, a traffic management device may observe signals and transmit a signal to a distributor to delete the connection key. In still another embodiment, a distributor monitors one or more signals within a flow. When the distributor observes the appropriate one or more signals, it may, in response, accelerate the aging for the corresponding connection. In order to determine that a proper FIN signal is observed in both directions of a flow, the distributor might store packet sequence numbers.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor provide steps for implementing the actions specified in the flowchart block or blocks.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A method of routing two or more flows of packets over a network, comprising:
    determining, at a traffic manager, when the two or more flows are related, and when the two or more flows are related, then
    transmitting a signal, from the traffic manager to a distributor computer, indicating that the at least two or more flows are related, and
    storing, at the distributor computer, a mapping of the at least two or more flows and the traffic manager; and
    receiving, at the distributor computer, a packet from one or more flows of the two or more flows, wherein receiving the packet includes:
        extracting a first connection key from the packet; and
        determining when the packet is associated with the traffic manager based in part on the mapping, and when the packet is unassociated with the traffic manager, extracting a second connection key from the packet, the second connection key comprising a subset of fields within the first connection key; and
    forwarding the packet from the one or more flows from the distributor computer to another traffic manager based in part on the second connection key.

2. The method of claim 1, wherein the first connection key further comprises two or more one of a source IP address, a destination IP address, a source port, virtual local area network (VLAN) identifier, and a destination port.

3. The method of claim 1, wherein storing the mapping further includes storing the first connection key and an association with the traffic manager.

4. The method of claim 1, further comprising mirroring the first connection key with another distributor computer.

5. The method of claim 1, wherein the one or more flows in the two or more flows is a control flow, and one or more other flows in the two or more flows is a data flow.

6. The method of claim 1, wherein the second connection key includes one or more Internet Protocol (IP) addresses in the first connection key that further includes port numbers.

7. The method of claim 1, wherein the other traffic manager is selected using a hash of a destination address of the packet or using a hash of a source address of the packet.

8. A system for routing, comprising:
    a plurality of traffic manager computers configured to route packets; and
    one or more distributor computers having one or more processors that execute software coded to perform actions, including:
        receiving a flow of packets;
        extracting a first connection key from a received packet; and
        when the received flow of packets is associated with one of the plurality of traffic managers based in part on a mapping determination, forwarding the received flow of packets to the one mapped traffic manager computer;
        when the received flow of packets is determined to be unassociated with the plurality of traffic manager computers, iteratively extracting an additional connection key from packets in the received flow of packets, wherein each additional connection key comprises a subset of fields that include less information than the previous additional connection key until a mapping is determined for another one of the plurality of traffic manager computers; and forwarding the received flow of packets to the other traffic manager computer based in part on the additional connection key.

9. The system of claim 8, wherein the first connection key further comprises two or more one of a source IP address, a destination IP address, a source port, virtual local area network (VLAN) identifier, and a destination port.

10. The system of claim 8, wherein the mapping further includes the first connection key and an association with the one of the plurality of traffic managers.

11. The system of claim 8, wherein the received flow of plackets includes at least a control flow and a data flow of packets.

12. The system of claim 8, wherein the other traffic manager is selected using a hash of a destination address of the packet or using a hash of a source address of the packet.

13. The system of claim 8, wherein the one or more distributor computers performs actions, further including:
  receiving another flow of packets;
  retrieving connection data that is associated with another packet in the received other flow of packets;
  when the connection data associated with the other packet in the received other flow includes a reset or delete message, deleting the connection data;
  when the connection data associated with the other packet indicates memorizing the connection data, storing another connection key associated with the received other flow of packets; and
  when the connection data indicates ageing the connection data, employing a timer to determine when to delete stored data for the received other flow of packets.

14. An apparatus, comprising:
  one or more processors; and
  one or more memories storing software code, wherein when the one or more processors execute the software code, the one or more processors perform actions, including:
    receiving a flow of packets;
    extracting a first connection key from a received packet; and
    when the packets are determined to be associated with one of a plurality of traffic managers based in part on a mapping determination, forwarding the flow of packets to the one traffic manager;
    when the packets are determined to be unassociated with the plurality of traffic managers, iteratively extracting an additional connection key from packets in the flow of packets, wherein each additional connection key comprises a subset of fields that include less information than the previous additional connection key until the packets are determined to be associated with another one of the plurality of traffic managers based in part on another mapping determination; and
    forwarding the packet flow to the other traffic manager based in part on the additional connection key.

15. The apparatus of claim 14, wherein the first connection key further comprises two or more one of a source IP address, a destination IP address, a source port, virtual local area network (VLAN) identifier, and a destination port.

16. The apparatus of claim 14, wherein the mapping determination further includes the first connection key and an association with the one of the plurality of traffic managers.

17. The apparatus of claim 14, wherein the flow of plackets includes at least a control flow and a data flow of packets.

18. The apparatus of claim 14, wherein the other traffic manager is selected using a hash of a destination address of the received packet or using a hash of a source address of the received packet.

19. The apparatus of claim 14, wherein performing actions, further includes:
  receiving another flow of packets;
  retrieving connection data that is associated with another packet in the other flow of packets;
  when the connection data associated with the other packet in the other flow includes a reset or delete message, deleting the connection data;
  when the connection data associated with the other packets indicates memorizing the connection data, storing another connection key associated with the other flow of packets; and
  when the connection data indicates ageing the connection data, employing a timer to determine when to delete stored data for the other flow of packets.

\* \* \* \* \*